Jan. 15, 1935.  A. P. WIEGAND  1,987,650
AEROPLANE PROPELLER
Filed April 11, 1931  6 Sheets-Sheet 1
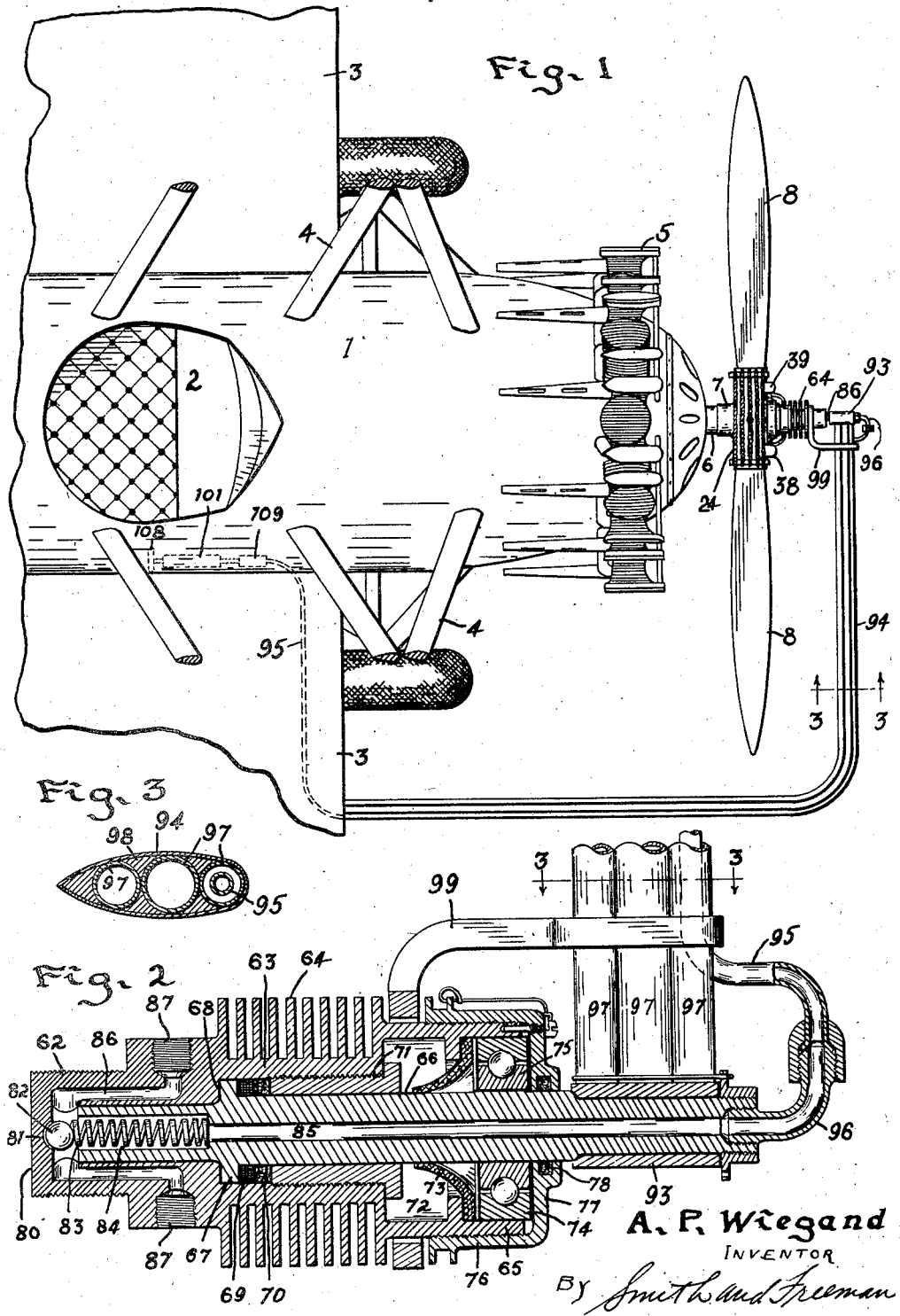

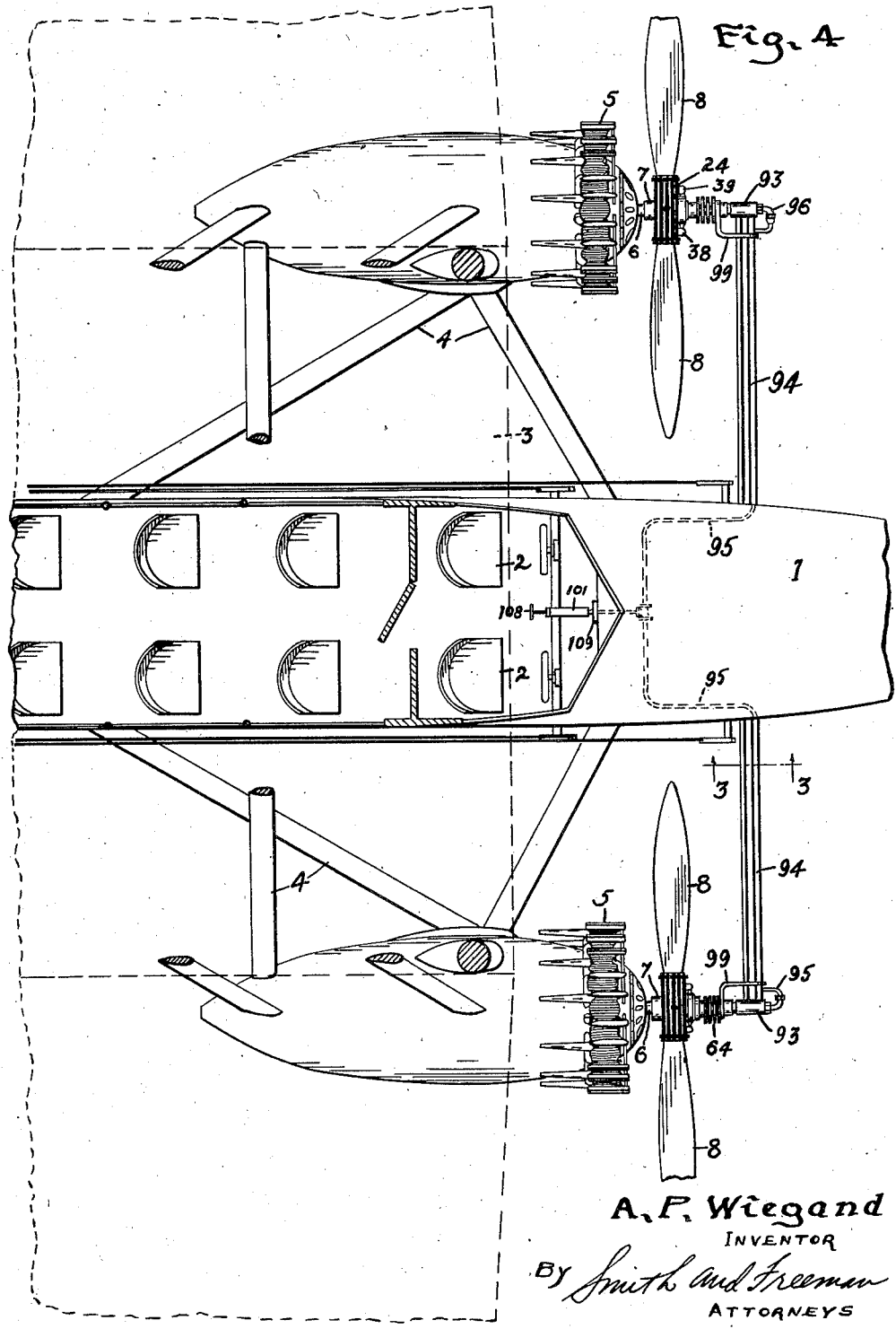

Jan. 15, 1935.  A. P. WIEGAND  1,987,650
AEROPLANE PROPELLER
Filed April 11, 1931  6 Sheets-Sheet 3
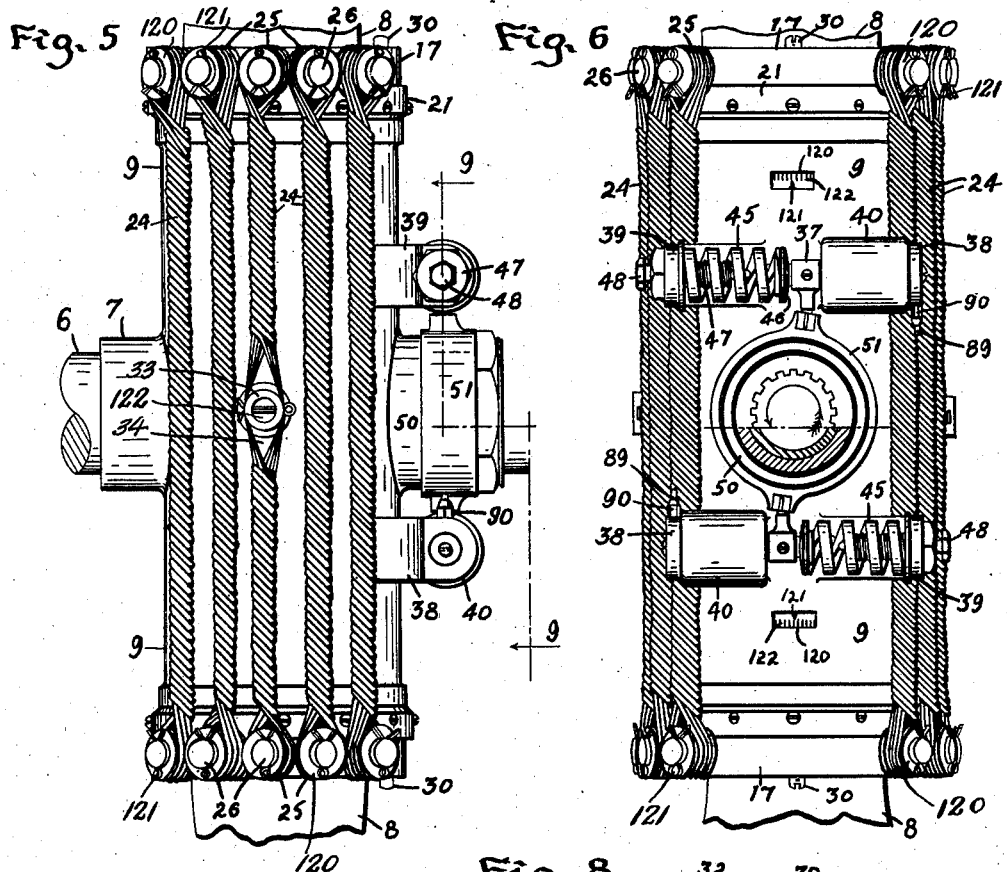
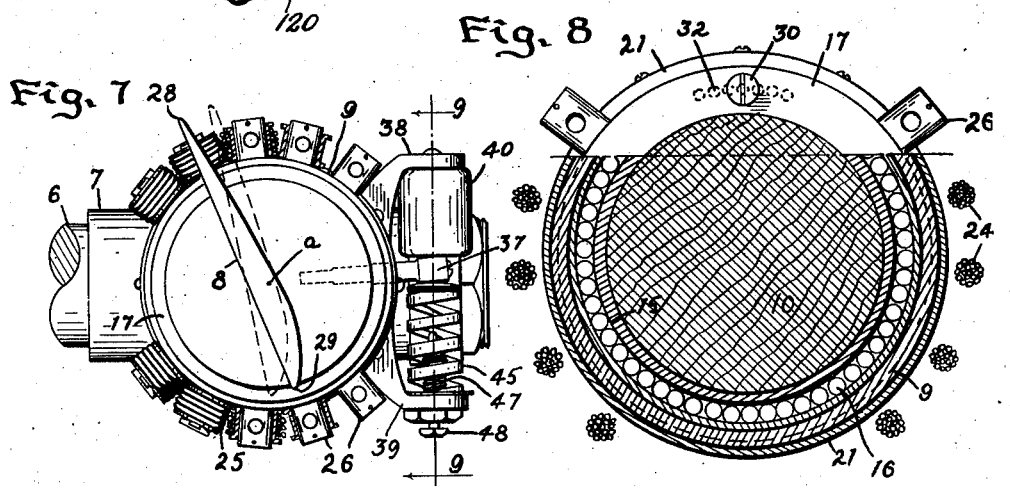
A. P. Wiegand
INVENTOR
By Smith and Freeman
ATTORNEYS

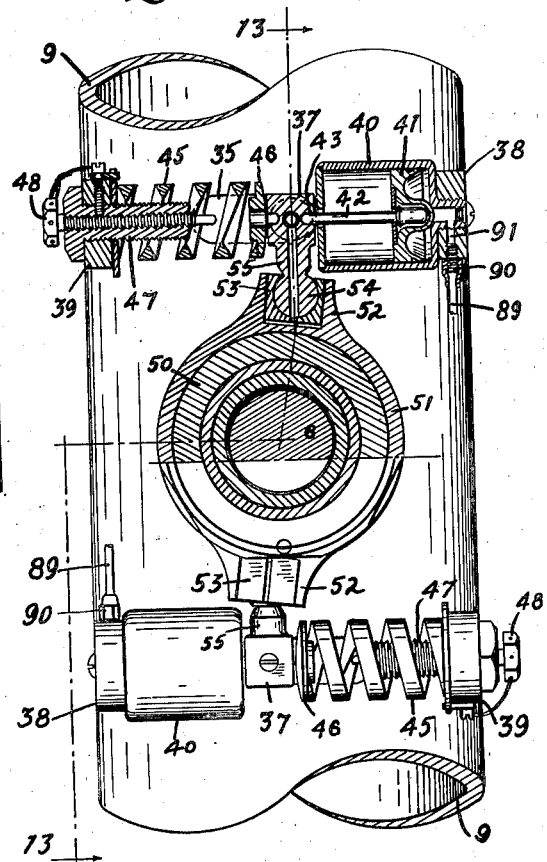

Jan. 15, 1935.    A. P. WIEGAND    1,987,650
AEROPLANE PROPELLER
Filed April 11, 1931    6 Sheets-Sheet 5
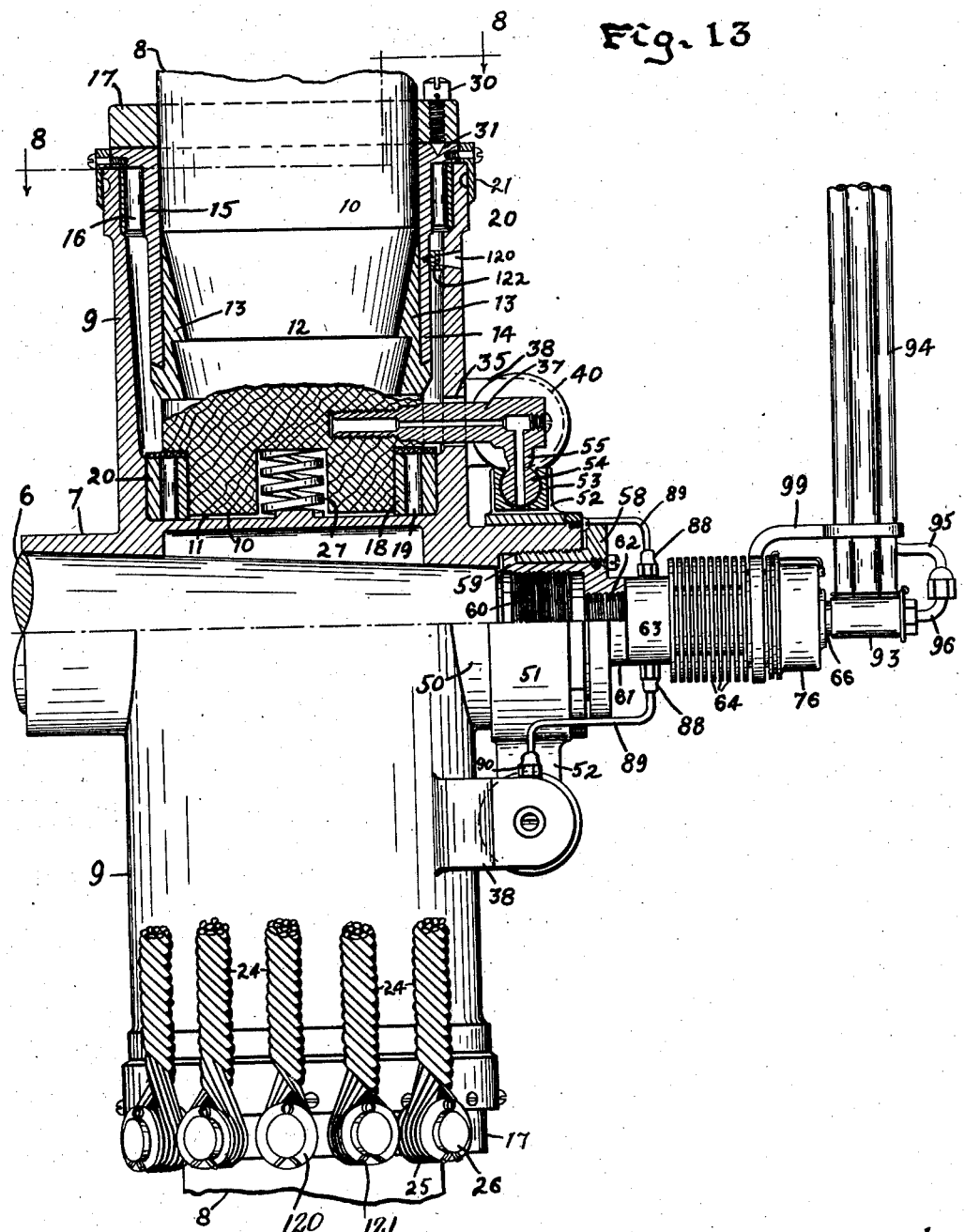

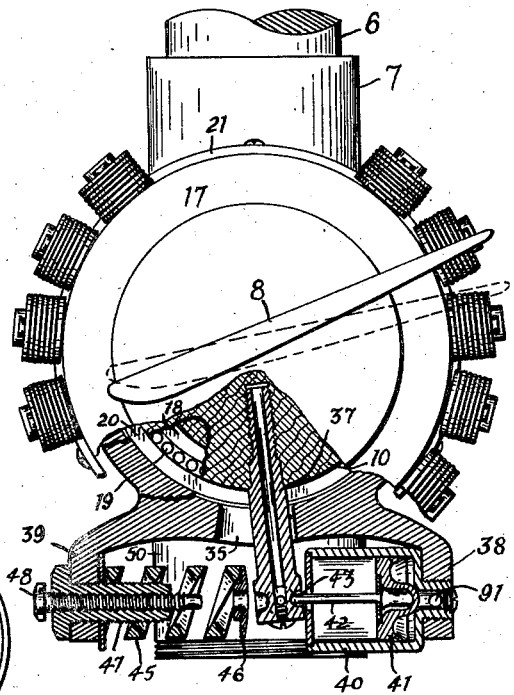

Patented Jan. 15, 1935

1,987,650

UNITED STATES PATENT OFFICE 1,987,650

AEROPLANE PROPELLER

Albert P. Wiegand, Pittsburgh, Pa.

Application April 11, 1931, Serial No. 529,430

47 Claims. (Cl. 170—163)

This invention relates to aeroplane propellers and has for its object the provision of improved mechanism for varying the pitch of the propeller blades according to the conditions of operation and the desire of the operator. The advantages of variability of blade-angle are well known, among which may be mentioned the constantly increasing necessity for quicker climbing due to use of progressively smaller landing fields; the reduction of fuel consumption amounting even as great as thirty to forty percent saving; the increased period possible between major overhauls of the motor an increase sometimes as great as one hundred percent; and the greater life of the motor thereby secured. For each condition of propeller and motor there is a certain definite optimum speed at which the performance lines of the two intersect. The optimum speed of an internal combustion engine is rather high and its power and efficiency fall off rapidly below a given speed. The optimum speed of a propeller is whatever it is designed for according to its pitch and contour, although its efficiency is decreased with increasing speed and falls off very rapidly at peripheral velocities approaching or exceeding the speed of sound. Besides each different design of craft exhibits different propeller requirements due to its weight, air resistance, and wing angle, all of which features are included in the term "drag". Finally the performance of any propeller with any kind of craft is much modified according to the atmospheric pressure wherein it works. Variations in barometric pressure near the earth's surface are too small to exhibit any substantial effect, but with the increasing tendency to pursue commercial journeys at high elevations the difference becomes important. By means of artificial feeding of the engines adequate power can be obtained in an atmosphere too tenuous to support human life, but this is of no value unless the propeller can take hold of the atmosphere so as to utilize that power.

The one attractive mode of accommodating all these varying requirements is by the provision of means for varying the pitch of the propeller blades. These considerations are not theoretical but actual. But the problem of producing a mechanical device of any kind which shall permit the operator to change the angle of the blades during full flight without involving such complications of construction as to render the propeller as a whole absolutely impractical is a very serious one especially when it is considered that the mere centrifugal force on the blades tending to disrupt the propeller at maximum speed is sometimes as great as thirty tons. Obviously nothing can be used that has not an adequate factor of safety even at these enormous stresses and experience has shown that gears and other mechanical devices sometimes employed for boat propellers are utterly impractical so that a new line of attack becomes important.

Accordingly the objects of this invention are the provision of a strong, simple, and reliable propeller having blades of variable pitch; the provision of simple and reliable means constantly under the control of the operator for varying the pitch of the blades according to requirements, between determined limits; the superposition upon the operator-control of a lesser degree of automatic control responsive to smaller changes in requirements; the provision of new and improved means operating by the combined use of fluid pressure and of centrifugal force for controlling the pitch of the blades and holding the same at the optimum angle; the provision of a variable pitch propeller wherein the adjusting features are of such character as not to impair in any way the size, shape, or utility of the device nor unduly increase its weight or complexity; the provision of a variable pitch propeller of such a character that in the event of complete destruction of the adjustment features the propeller will still exhibit a workable margin of utility; the provision of an adjustable pitch propeller of a hydraulic control type which can be applied to any motor without requiring any changes in that motor; the provision of an adjustable pitch propeller for air craft wherein the pitch control mechanism is connected at that face of the propeller which is opposite the engine and otherwise than by way of the propeller shaft; while further objects and advantages of the invention will become apparent as the description proceeds.

In the drawings accompanying and forming a part of this application I have shown certain physical embodiments of my inventive idea though it will be understood that these drawings are intended to be merely illustrative and not restrictive.

Fig. 1 is a top plan view of the fuselage and lower wing of a single engine biplane provided with my improvements; Fig. 2 is an enlarged detail view of the rotary joint provided at the forward end of the propeller hub; Fig. 3 is a sectional view corresponding to the line 3—3 of Figs. 1, 2, and 4 drawn to enlarged scale; Fig. 4 is a top plan view showing my improvements as applied to a double engined monoplane; Fig. 5 is a side elevation of my improved propeller hub; Fig. 6 is a front elevation of the hub shown in Fig. 5; Fig. 7 is a top plan view of the propeller shown in Figs. 5 and 6 taken lengthwise of a blade; Fig. 8 is a horizontal sectional view on the broken line 8—8 of Fig. 13; Fig. 9 is a sectional view corresponding to the broken line 9—9 of Figs. 5 and 7; Fig. 10 is a view similar to Fig. 5 showing a modified construction of tension members; Fig. 10a is an enlarged detail view of the middle portion of Fig. 10; Fig. 11 is a plan view of the modification shown in Fig. 10 looking downwardly at one blade; Fig. 12 is a perspective view of certain of the parts employed in Fig. 11; Fig. 13 is a side elevation, partly in section of one of my improved propellers drawn to enlarged scale; Fig. 14 is a top plan view of the propeller shown in Fig. 13 looking down at one blade, parts being broken away to show the internal construction; and Fig. 15 is a view partly in section and partly in elevation of the operator control mechanism located in the fuselage.

Describing by reference characters the parts shown by the accompanying drawings, 1 represents the fuselage of an aircraft, 2 the operator's seat, 3 the wings, 4 the wing-struts, 5 the motor, and 6 the motor-shaft. These parts may be of any desirable or convenient design or location. Rigidly secured to the end of each motor-shaft is the hub 7 of the propeller having blades 8—8. This hub is provided with two oppositely-projecting, radial, hollow sockets 9—9, in which the shanks 10—10 of the respective blades are mounted for free rotation and also for free movement lengthwise of their own axes and radially of the shaft-axis. In the present embodiment this shank is made of wood as being easily distinguishable in the drawings and extends inwardly substantially to the bottom of the socket, which is indicated at 11 in Fig. 13, but is reduced externally as indicated at 12 for the reception of the longitudinally-split collar 13, over which is slipped the metal sleeve 14 which carries the cone or inner race-way 15 of the roller-bearing 16 and also constitutes the seat for the ring 17. At its inner end the blade-shank is surrounded by a metal sleeve 18, constituting the inner race-way for the roller-bearing 19. Suitable external race-ways 20—20 surround the respective bearings inside the socket 9, and a protecting band 21 secured to the outer end of the sleeve 14 overlaps the end of the socket to exclude weather.

Each shank is surrounded immediately outside the sleeve 14 by a ring 17 connected to the opposite ring by a plurality of straight, parallel, substantially inextensible tension-members 24. The word "inextensible" is used in substantially its absolute sense having regard to the tremendous centrifugal force heretofore described. My present preference is to make these tension members of twisted cables of piano wire having their ends looped as at 25 about sleeves 120, rotatably supported by radial rigid pins or studs 26 carried by the rings 17, and the sleeves 120 are held in position by means of pins 121 extending diametrically through the studs 26. However in the modification shown in Figs. 10, 11, 12, these members consist of straight flat strips 24ª of steel or other suitable metal, laminated and riveted together if desired, and received edgewise in suitable notches 26ª formed in the ring 17ª, suitable pins 25ª being employed to connect the parts, as for example by enlarging the portion at the turn so as to prevent it from pulling through the notches 26ª. These tension members, whatever their form and construction, constitute the means by which centrifugal disruption of the propeller is prevented, and within the limits imposed by these members the blade-shanks can move longitudinally in their respective sockets. The freedom of movement thus permitted is rather small, not more than a few hundredths of an inch; and I preferably provide a spring 27 mounted axially of each shank to maintain a tension on these members when the propeller is at rest, and keep the two blades equidistant from the shaft-axis. This equality of distance is further protected by fastening one or more of the tension members to the exterior of the hub as by a bushing 33 rotatably carried by a stud 122 rigidly mounted on the hub 7, and the bushing 33 is rigidly secured to one of the tension members 24 in an aperture 34 made for the purpose in one of the tension members. With the modified form of tension members shown in Figs. 10, 11 and 12 I employ a bifurcated stud 33ª through which one of the tension members extends, the interior of the stud being hollowed out and the metal strips 24ª being expanded therein by means of a pin 34ª forced between them. Each of the propeller-blades is made asymmetrical with respect to the axis of its shank, as indicated for example in Fig. 7 where "a" represents that axis, the trailing edge 28 of each blade extending to a substantially greater distance from its axis than does the advancing edge 29 (see Figs. 7 and 11). As a consequence of the centrifugal force the tension imposed upon the tension-members 24 tends to set them parallel with each other and with the common axis of the blade-shanks, while the air-thrust on the blade tends to rotate the same toward the position shown in dotted lines in Fig. 7, thereby tending to impart to said tension members an inclined position contrary to the effect of the centrifugal force. The blades are set originally with the tension members substantially parallel to the blade-axes at which time the blades have their maximum angularity. The amount of angularity chosen is determined by the engine speed, thrust desired, drag, and other factors; it is adjusted by rotating the rings 17 upon their respective sleeves, the desired adjustment being retained by means of a screw 30 having a tapered point 31 which fits in any one of a series of recesses 32. Increase of traction, as by increase of climbing angle tends to rotate the blades to decrease their angle. The angularity change thus automatically produced is quite small, being opposed as it is by the whole centrifugal force acting on the blades, though enough play is left between the parts to avoid any wedging strain under the most extreme conditions of deflection. The blade angle due to this automatic change tends to be increased upon increase of speed (because centrifugal force tends to increase the blade angle and is itself increased proportionally to the square of the speed) and is decreased by the tractive effect due to air pressure on the trailing edge of the blades, since the effect of increased traction is to tend to slow the engine, thus tending to decrease the blade angle both by reducing the centrifugal force and by twisting the blade directly. Hence these automatic conditions act together to increase or decrease the blade angle in the desirable directions, though not in direct proportion, and not to a sufficient degree to satisfy all desirable conditions. With blades of the customary weights and speeds, the automatic change of angle is as high as 2° of arc, which is about 25% of the total change ordinarily desirable to compensate different operating conditions. In general it may further be stated that a change in blade angle of 1° will ordinarily change the engine speed about 60 R. P. M. when occurring at about the optimum engine-propeller speed, although it will be understood that all such figures are approximations and vary with different engines, propellers, craft-speeds, and altitudes.

According to my present invention I superpose upon this automatic adjustment (which constitutes the subject matter of my application Ser. No. 420,378, filed Jan. 13, 1930), a fluid-pressure controlling device actuable by the operator, and the preferred mode of accomplishing this will now be described.

Formed in the side wall of each socket 9 is a horizontally elongated slot 35 through which projects a strong metal arm 37 having its inner end rigidly mounted in the blade shank 10 and having its outer end projecting between a pair of rigid outstanding arms 38, 39, carried by the exterior of the socket-member 9, preferably on the side thereof opposite to the engine. Carried by the bracket 38, between itself and the end of the arm 37 is a hollow cylinder 40 having its axis parallel to a line which is tangent to the socket 9 and having therein a tightly fitting slidable piston 41 provided with a piston-rod 42 whose outer end is seated in a recess 43 formed at one side of said arm. Carried by the opposite bracket 39 is a compression spring 45 provided with a suitable headpiece 46 which engages and presses upon the opposite side of the arm 37. I have also shown the bracket 39 as provided with a double screw, of which the outer screw 47 constitutes a fixed stop for the arm 37, and the inner screw 48 an adjustable stop therefor. The spring 45 is so positioned as to tend to move the blade always towards an angle of maximum inclination; while the effect of the piston is exerted in the opposite direction.

At its forward side the hub 7 is formed coaxially of the shaft 6 with an externally-cylindrical hollow extension 50 on which is rotatably mounted a collar 51 provided at diametrically opposite points with radial sockets 52 in which are mounted the cup-members 53 embracing ball-heads 54 connected rigidly to the arms 37 by means of shanks 55. In this way the two blades are compelled to rotate simultaneously and thus maintain diametric balance.

The extension 50 is threaded internally for the reception of the threaded collar 58 which in turn engages the exterior of the hollow member 59 whose interior is threaded for attachment to the terminal threads 60 of the engine shaft 6. The outer end of the member 59 is formed with an internally threaded projection 61 in which is mounted the threaded end 62 of a rotary gland, a preferred form of which is illustrated in Fig. 2.

In its present form the body of this gland comprises a hollow cylindrical barrel 63 coaxial with the portion 62, having a plurality of external flanges 64 for heat dissipation, and formed at the end opposite the portion 62 with an externally threaded, internally hollow portion 65. Rotatably mounted inside the barrel 63 is a spindle 66 formed with an enlarged circumferential flange 67 seated against a shoulder 68 at one end of said barrel and surrounded by a floating Babbitt-metal packing-ring 69 and a lignum vitæ packing ring 70, interposed between that flange and the extremity of a screw threaded nut 71 which tightly engages the barrel interior. Outside of this nut, in a chamber 72 provided therefor inside the portion 65, is a cup-shaped packing-ring 73 which may be either leather or thin flexible bronze suitably secured to the outer wall-portion of the barrel; and also located inside and carried by the portion 65 is the race-member 74 of a ball-bearing whose inner or cone member 75 engages the exterior of the spindle 66. Screwed on the outside of the portion 65 is a hollow cap 76 having an end-flange portion 77 provided with a packing-ring 78 of felt which engages the spindle. The extremity of the portion 62 is closed by a web 80 formed at its center with a seat 81 for a bearing-ball 82 held thereto by a spring 83 located in the enlarged inner end 84 of the longitudinal bore 85 with which said spindle is formed; and communicating therewith by means of longitudinal passage-ways 86 formed in the side wall of the barrel are the radial threaded sockets 87 to which are secured the ends 88 of oil-pipes 89, whose opposite ends 90 communicate with the cylinders 40—40 by means of suitable ducts 91 formed in the brackets 38.

The outer end of the spindle 66 is tightly secured in a metal block 93 carried by the extremity of bracket 94 which extends from some convenient part of the machine, such as one of the wings 3 as shown in Fig. 1, or from the side of the fuselage shown in Fig. 2; and carried by this bracket is a fluid-pressure pipe 95 having one end communicating with the duct 85 by means of a connection 96 of any suitable character, and having its opposite end connected to an operator-controlled pressure-producing element located inside the fuselage as will be described hereafter. In its preferred form this bracket 94 consists of a series of parallel, hollow, steel tubes 97 surrounded by a suitable wrapping 98 to produce a stream-line contour, the pipe 95 being located inside one of these tubes. In order to reduce the danger of this bracket becoming entangled with the propeller in the event of any breakage a tie-element 99 is shown, having one end embracing the body 63 and the other end engaging the bracket in steadying relation.

A preferred form of the operator-control mechanism is shown in Fig. 15 and comprises two compressor-cylinders 101 and 102 connected to a manifold 103 which in turn is connected to the fluid pipe 95. Located in the cylinders are the tightly fitting pistons 104 and 105, respectively, to which are connected the threaded stems 106 and 107, respectively, each provided with a hand wheel 108 by means of which the piston may be moved backwards or forwards. A pressure gauge 109, also conveniently located for observation by the operator, is attached to a neck 110 with which the manifold 103 is provided, and I have also shown a filling neck 111 carried by said manifold and covered by a screw-cap 112. It is also possible, if desired, to provide one or both of the cylinders with a cut-off valve 113. I have shown the cylinder 101 as horizontal and the cylinder 102 as obliquely converging relatively thereto. The cylinder 101 is the operating cylinder and 102 is the calibrating cylinder. Carried by cylinder 101 is a graduated scale 115 past which moves a pointer 116 carried by or movable with the piston 104. In this embodiment I have shown the side wall of the cylinder as formed with a longitudinal slot 117 for the accommodation of this pointer, although this feature like many other features of the apparatus is susceptible of considerable variation. The side wall of each of the socket members 9 is formed with an inspection aperture 120

(see Fig. 6), provided with a pointer 121, and inside the same and visible therethrough is a graduated scale 122 carried by the blade-shank so as to indicate visually the angular position of the blade. Of course this last scale can be observed only when the propeller is at rest, but preferably the calibration of the scale 122 is the same as the calibration of the scale 115 so that the latter serves to indicate the angularity during flight.

The operation of the mechanism is as follows: The cap 112 is removed and the manifold, piping, and both cylinders filled with a suitable pressure-transmitting liquid, preferably lubricating-oil of non-freezing quality, and air bubbles driven out from the piping and parts, after which the piston 104 is set to the same position on the scale 115 that the pointer 121 indicates on the scale 122. The parts being at rest, this is generally, and preferably, the position of maximum inclination of the blade as compared with the plane of rotation defined by the propeller, the blades, at this time, being pressed towards this position of maximum deflection by the springs 45, which force the pistons 41 to the ends of their respective cylinders 40 as shown in Fig. 9. The arms 37 project freely through the slots 35 at all times so as to permit the slight longitudinal movement of the blade shanks heretofore described. The piston 105 is drawn nearly to the outer end of its cylinder 102 as shown in Fig. 15 and the plug 112 is applied at a time when the oil level stands at the top of the branch 111 thus insuring that no air bubbles are included in the system which being compressible would disturb the operation. The only purpose of the cylinder 102 and its piston 105 is henceforth to serve as a reservoir for liquid so as to replenish any leakage which may occur and to enable the reading of the two scales to be maintained in unison.

During the time that the propeller is at rest the only outward pressure exerted upon the tension members 24 is that of the springs 27 (see Fig. 13), these tension members being substantially parallel to the blade axes; as soon as rotation commences the centrifugal force imposes a strong longitudinal pull on these tension members 24 and at the same time the unbalanced air pressure upon the blades tends to rotate the same towards the position shown in dotted lines in Fig. 7, which rotation is opposed by the comparatively feeble strength of the springs 45 and also by the much greater force required to produce the necessary inclination of the tension members 24. The rotating effect due to the last named force varies directly with the sine of the angle included between the axis of each tension member and the axis of the blade, this sine being zero when the included angle is zero (blade angle a maximum) and increasing according to the sine-law so as with a very small decrease in angle of the propeller blades to surpass the effect of the springs 45. This action, however, is wholly independent of the fluid-pressure devices, although the latter when employed work in the same sense as does the effect of thrust on the trailing edge.

If now the operator desires to decrease further the angle of the propeller blade he rotates the hand wheel 108 of cylinder 101, so as to advance the piston 104 whereupon the pistons 41 are displaced in their respective cylinders so as to rotate the blades against the force both of the springs 45 and of the tension members 24, the rotation of these blades being maintained equal at all times by the effect of the ring 51. The heat generated by friction in the rotary gland at the front of the propeller is dissipated by the air currents contacting with the cooling fins 64. The gauge 109 has the double function of indicating the amount of pressure working against the propeller blades and of indicating the well-being of the fluid-pressure system, inasmuch as any breakage or sudden leak causes that pressure to become lost. Even with a complete loss of pressure, however, the mechanism is still operative since the blades merely return to their position of maximum inclination, subject only to the automatic deflection of the unbalanced air pressure thereon.

The use of the tension members 24 to secure the blades to the propellers exhibits at least as great strength and security as any other mode I have been able to conceive, and to this is added the safeguard of the arms 37 which are, preferably, made of alloy steel and of a strength sufficient to hold the parts together even if the tension members should all break. During rotation of the propeller the only added friction due to this adjusting device is that of the spindle 66 inside the rotary gland, and despite any failure or destruction of this adjusting mechanism the propeller retains at least a minimum amount of propeller action suitable for safe flying although the efficiency of operation would be somewhat impaired. The bracket 94 is at least no more fragile nor prone to injury than the propeller itself, and the attachment of the fluid-pressure devices at the front of the propeller avoids any need of boring or otherwise changing the engine-shaft and enables the use of a smaller and safer rotary gland than could be employed anywhere in the rear of the propeller.

It will be understood however that while I have described my invention in considerable detail so as to point out the best form thereof I do not limit myself to any of these details since a great many changes can be made therein without departing from the scope of my idea and I do not limit myself to any of these details except as the same are specifically recited in my several claims which I desire may be construed each in accordance with its own limitations and without respect to limitations contained in other claims.

Having thus described my invention what I claim is:

1. A propeller for the purpose described having a plurality of blades each of which is rotatable about its own axis, separate and independent resilient means for each blade tending to hold said blade at its maximum angle of thrust, and hydraulic means independently connected to each blade operable to move the blades to reduce such angle of thrust.

2. A propeller for the purpose described comprising a plurality of blades each of which is rotatable about its own axis, each blade being asymmetric relative to its axis so that the unbalanced air pressure due thereto tends to rotate said blade about its axis, in combination with separate fluid pressure responsive means for each blade carried by and rotatable with said propeller and operatively connected to each blade for rotating said blades about their axes, stationary pressure-producing means, and fluid pressure transmitting means connecting said pressure producing means to each of said first means, said transmitting means including a rotatable member coaxial with said propeller.

3. A propeller for the purpose described comprising a plurality of blades each of which is rotatable about its own axis, means operative by the centrifugal force of the blades to hold said blades at a determined angle of thrust, and hydraulic means operable to move said blades to change said angle of thrust against the effect of said first means.

4. A propeller for the purpose described comprising a plurality of blades each of which is rotatable about its own axis, means operative by centrifugal force of the blades to hold said blades at a determined maximum angle of thrust, and means for imposing a moment of force upon said blades during the rotation of said propeller in opposition to said first means whereby the angle of thrust is controllably reduced, independent of the speed of rotation of said propeller.

5. A propeller for the purpose described comprising a blade which is rotatable about its own axis, said blade being asymmetric relative to said axis so that the unbalanced air pressure due thereto tends to rotate said blade about that axis, means operative by the centrifugal force of the blade to hold the same at a determined maximum angle of thrust and hydraulic means for reducing such angle of thrust.

6. In a propeller, in combination, a hub having a substantially radial socket, a blade having a shank slidably and rotatably mounted in said socket, means holding said blade in said socket against the effect of centrifugal force, a cylinder arranged parallel to a line which is tangent to the blade shank, a piston in said cylinder, said cylinder and piston being connected one to the blade shank and the other to a part of said hub, and means working through a rotary gland which is coaxial with said hub transmitting fluid pressure to said cylinder.

7. In a propeller, in combination, a hub having a pair of oppositely projecting radial sockets, blades projecting from said hub and having shanks pivoted one in each socket, equalizing means connecting said shanks together and causing the same to rotate equally in their respective sockets, and means independent of said equalizing means and including a fluid pressure responsive element for rotating one of said blades.

8. In a propeller, in combination, a hub having a pair of oppositely projecting radial sockets, blades projecting from said hub and having shanks pivoted one in each socket, equalizing means connecting said shanks together and causing the same to rotate equally in their respective sockets, a cylinder arranged parallel to a line which is tangent to each blade shank, a piston in each cylinder, said cylinder and piston being connected, one to each blade shank and the other to a part of said hub adjacent thereto, and means for conducting fluid pressure to said cylinders, said means comprising a rotary joint which is coaxial with said hub.

9. In a propeller, in combination, a hub having radial sockets, blades carried by said hub and having shanks pivoted one in each socket, means operative by the centrifugal force of said blades for turning said blades towards a determined angle of inclination relative to the plane of rotation, means limiting such turning of the blades, and fluid pressure means under control of the operator for turning said blades in the opposite direction.

10. An aircraft propeller having a rotary gland coaxial therewith and located on the side opposite the engine, and an oil pipe extending past the propeller disk and connected to said gland.

11. An aircraft propeller having angularly adjustable blades, and multiple fluid responsive operator-control means connected to that side of the propeller which is opposite the engine whereby the angle of said blades can be varied during rotation.

12. The combination with an aircraft propeller of a bracket projecting past the propeller disk and operatively connected with said propeller at the side opposite to the engine, and hydraulic means working through said bracket for adjusting the angle of the blades during the rotation of said propeller.

13. An aircraft propeller having fluid responsive angle control mechanism located in front of the hub and control connections from said mechanism to the operator passing around the propeller disk.

14. An aircraft propeller having angle control mechanism and hydraulic control connections from said mechanism to the operator, said connections passing around the propeller disk and attached to that side of the propeller which is opposite the engine.

15. An aircraft propeller having blades loosely mounted in radial sockets for rotary and longitudinal movements relative to the axis of said sockets, tension members connecting said blades past the outside of said hub, and means rotating with said hub for turning said blades in their sockets against that component of force of said tension members which is tangential to the blade shanks.

16. An aircraft propeller comprising a hub formed with oppositely projecting, aligned radial sockets, blades having shanks rotatably and slidable mounted in said sockets, tension members connecting said blades past the outside of said hub, means carried by and rotating with said hub for turning said blades in opposite directions in their sockets in opposition to that component of force of said tension members which is tangential to the blade shanks, and power transmitting means from said first means to the operator, said transmitting means including a rotatable member which is coaxial with said propeller.

17. An aircraft propeller having blades loosely mounted in radial sockets for rotary and longitudinal movements relative to the axis of said sockets, tension members connecting said blades past the outside of said hub, means rotating with said hub for turning said blades in their sockets against that component of force of said tension members which is tangential to said sockets and means connected to that part of the hub which is opposite the engine and extending thence past the propeller disk for actuating said first means.

18. An aircraft propeller having blades loosely mounted in radial sockets for rotary and longitudinal movements relative to the axis of said sockets, tension members connecting said blades past the outside of said hub, fluid pressure-responsive means rotating with said hub for turning said blades in their sockets against that component of force of said tension members which is tangential to the sockets, means for producing and controlling fluid pressure, and means conducting such pressure to said pressure-responsive means.

19. An aircraft propeller having blades loosely mounted in radial sockets for rotary and longitudinal movements relative to the axis of said sockets, each blade being asymmetric relative to the axis of its socket, tension members connecting said blades past the outside of said hub, and means rotating with said hub for turning said blades in their sockets in the same direction as that in which the unbalanced air pressure tends to turn them and in the opposite direction from that component of force of said tension members which is tangential to said sockets.

20. An aircraft propeller having blades loosely mounted in radial sockets for rotary and longitudinal movements relative to the axis of said sockets, each blade being asymmetric relative to the axis of its socket, tension members connecting said blades past the outside of said hub, fluid-pressure responsive means rotating with said hub for turning said blades in their sockets in the same direction as that in which the unbalanced air pressure tends to turn them and in the opposite direction from that component of force of said tension members which is tangential to said sockets, means controlled by the operator for producing and controlling fluid pressure, and means including a swivel joint for conveying such pressure to said first means while the propeller is revolving.

21. A propeller for the purpose described, comprising: a blade rotatable about its longitudinal axis; means affected by centrifugal force and tending to hold said blade at a determined angle of thrust, but permitting longitudinal and rotative movement of said blade; said blade being asymmetric relative to its axis so that the unbalanced air pressure due thereto and developed as a result of rotating said propeller, provides a force tending to automatically rotate said blade about its longitudinal axis, said rotation being opposed by said centrifugally affected means; and hydraulic means, operable to alter the angular deflection of said blade at will.

22. A propeller for the purpose described, comprising: a blade rotatable about its longitudinal axis; means affected by centrifugal force tending to hold said blade at a determined angle of thrust; and hydraulic means, independent of said first means, operable to alter the angular deflection of said blade, at will, from that maintained by said first means.

23. A propeller for the purpose described, comprising: a blade rotatable about its longitudinal axis; resilient means exerting a force tending to hold said blade at a determined angle of thrust; means affected by centrifugal force, also tending to hold said blade at said determined angle; and means, working against said resilient means and said second means, and operable to alter the angular deflection of said blade, at will, from that maintained by said resilient means and said second means.

24. A propeller having an angularly adjustable blade; resilient means, operable substantially parallel with respect to the plane of rotation of said propeller and laterally with respect to the longitudinal axis of said blade, tending to hold said blade at a determined pitch; and hydraulic means for altering the pitch of said blade.

25. A propeller having an angularly adjustable blade; resilient means, rotatable with said propeller, operable substantially parallel with respect to the plane of rotation of said propeller and laterally with respect to the longitudinal axis of said blade, tending to hold said blade at a determined pitch; and hydraulic means for altering the pitch of said blade.

26. A propeller having an angularly adjustable blade; resilient means, rotatable with said propeller, operable substantially parallel with respect to the plane of rotation of said propeller and laterally with respect to the longitudinal axis of said blade, tending to hold said blade at a determined pitch; and hydraulic means rotatable with said propeller for altering the pitch of said blade.

27. A propeller having an angularly adjustable blade; means tending to hold said blade at a determined pitch; and fluid pressure responsible means independent of said first means, operable substantially parallel with respect to the plane of rotation of said propeller and laterally with respect to the longitudinal axis of said blade, for altering the pitch of said blade.

28. A propeller having a plurality of angularly adjustable blades; means tending to hold said blades at a determined pitch; and fluid pressure responsive means, for each of said blades, independent of said first means, and independently connected to each of said blades for altering the pitch of said blades.

29. A propeller having an angularly adjustable blade; resilient means, rotatable with said propeller, tending to hold said blade at a determined pitch; and fluid pressure responsive means, operable substantially parallel with respect to the plane of rotation of said propeller and laterally with respect to the longitudinal axis of said blade, for altering the pitch of said blade.

30. A propeller having an angularly adjustable blade; resilient means, rotatable with said propeller, tending to hold said blade at a determined pitch; and fluid pressure responsive means, rotatable with said propeller, operable substantially parallel with respect to the plane of rotation of said propeller and laterally with respect to the longitudinal axis of said blade, for altering the pitch of said blade.

31. A propeller having a plurality of angularly adjustable blades; separate and independent resilient means for each of said blades, tending to hold said blades at a determined pitch; and fluid pressure responsive means, for each of said blades, independently connected to each of said blades, for altering the pitch of said blades.

32. A propeller having an angularly adjustable blade; resilient means tending to hold said blade at a determined pitch; and fluid pressure responsive means for altering the pitch of said blade, said resilient means and said fluid pressure responsive means being rotatable with said propeller, and operable substantially parallel with respect to the plane of rotation of said propeller and laterally with respect to the longitudinal axis of said blade.

33. A propeller, comprising: a plurality of angularly adjustable blades; means affected by the centrifugal force of said blades, tending to hold said blades at a determined pitch; and hydraulic means rotatable with said propeller, operable to alter the pitch of said blades against the effect of said first means.

34. A propeller, comprising: a plurality of angularly adjustable blades; means tending to hold said blades at a determined pitch; means affected by centrifugal force of said blades, also tending to hold said blades at said determined pitch; and hydraulic means, working against said first and said second means, and operable to alter the pitch of said blades.

35. A variable pitch propeller, comprising: a hub having radially disposed extensions; blades rotatably supported by said extensions; elongated thrust transmitting elements for anchoring said blades to said hub, said elements acting to take up centrifugal stresses tending to move said blades relatively with respect to said hub, and said elements tending to hold said blades at a determined pitch angle; and means for securing at least one of said elongated elements intermediate said blades to said hub, for maintaining said blades equidistant with respect to the axis of rotation of said hub.

36. A variable pitch propeller, comprising: a hub having radially disposed extensions; blades rotatably supported by said extensions; elongated thrust transmitting elements for anchoring said blades to said hub, said elements acting to take up centrifugal stresses tending to move said blades relatively with respect to said hub, and said elements tending to hold said blades at a determined pitch angle; a member rigidly secured to said hub intermediate said blades; and means rotatably carried by said member, and rigidly secured to at least one of said elongated elements, for maintaining said blades equidistant with respect to the axis of rotation of said hub.

37. A variable pitch propeller, comprising: a hub having radially disposed extensions; blades rotatably supported by said extensions; elongated thrust transmitting elements for anchoring said blades to said hub, said elements acting to take up centrifugal stresses tending to move said blades relatively with respect to said hub, and said elements tending to hold said blades at a determined pitch angle; a member rigidly secured to said hub intermediate said blades; means rotatably carried by said member, and rigidly secured to at least one of said elongated elements, for maintaining said blades equidistant with respect to the axis of rotation of said hub; studs carried by said blades; and means rotatably carried by said studs, and secured to the opposite ends of said elongated elements.

38. A variable pitch propeller, comprising: an angularly adjustable blade; fluid responsive means for altering the pitch of said blade; members coaxial with the axis of rotation of said propeller, rotatable with respect to each other; a washer floatably mounted between said members, said washer being adapted to rotate with respect to said members; and means for passing fluid through said members, effecting operation of said fluid responsive means.

39. A variable pitch propeller, comprising: an angularly adjustable blade; fluid responsive means for altering the pitch of said blade; members coaxial with the axis of rotation of said propeller, one of said members being stationary and the other of said members being rotatable with said propeller; a washer floatably mounted between said members, said washer being adapted to rotate with respect to said members; and means for passing fluid through said members, effecting operation of said fluid responsive means.

40. An aircraft propeller having a rotary gland coaxial with respect to the axis of rotation of the propeller, and located with respect to said propeller on the side opposite the engine; and means for supplying fluid to said gland.

41. An aircraft propeller having an angularly adjustable blade; fluid responsive means for altering the pitch of said blade; a rotary gland coaxial with the axis of rotation of said propeller, and communicating with said fluid responsive means; and fluid pressure producing means, communicating with said rotary gland, for effecting operation of said fluid responsive means, said rotary gland and said fluid responsive means being located with respect to said propeller on the side opposite the engine.

42. A propeller, comprising: a plurality of angularly adjustable blades; resilient means to hold said blades at a predetermined pitch; means affected by centrifugal force of said blades, also tending to hold said blades at said determined pitch; and hydraulic means, working against said resilient means and said second means, and operable to alter the pitch of said blades.

43. An aircraft propeller, comprising: an angularly adjustable blade; fluid responsive means for altering the pitch of said blade; members coaxial with the axis of rotation of said propeller, and located with respect to said propeller on the side opposite the engine, one of said members being stationary and another of said members being rotatable with said propeller; and means for passing fluid through said members, effecting operation of said fluid responsive means.

44. An aircraft propeller, comprising: an angularly adjustable blade; fluid responsive means for altering the pitch of said blade; members coaxial with the axis of rotation of said propeller, and located with respect to said propeller on the side opposite the engine, one of said members being stationary and another of said members being rotatable with said propeller; conduit means projecting past the propeller disc and connected to said stationary member; and means for passing fluid through said conduit means, and through said members, effecting operation of said fluid responsive means.

45. A propeller for the purpose described, comprising: a hub; a blade in said hub, rotatable about its longitudinal axis; means affected by centrifugal force tending to hold said blade at a determined angle of thrust; means for moving said blade radially with respect to said hub, and also cooperating with said first means to hold said blade at said determined angle of thrust; and hydraulic means operable to alter the angular deflection of said blade, at will, from that maintained by said first means and said second means.

46. A propeller having a plurality of angularly adjustable blades; means tending to hold said blades at a predetermined pitch; fluid pressure responsive means, for each of said blades, each connected to one of said blades for altering the pitch of said blades from that maintained by said first means; and fluid pressure producing means, communicating with said fluid responsive means, for operating said fluid responsive means, said fluid pressure producing means exerting pressure upon said fluid responsive means only under predetermined condition.

47. A propeller, comprising: an angularly adjustable blade; means affected by the centrifugal force of said blade, tending to hold said blade at a determined pitch; and hydraulic means operable to exert pressure against said blade to alter the pitch of said blade from that maintained by said first means, said hydraulic means exerting pressure upon said blades only under predetermined conditions.

ALBERT P. WIEGAND.

CERTIFICATE OF CORRECTION.

Patent No. 1,987,650.                                                     January 15, 1935.

ALBERT P. WIEGAND.

It is hereby certified that error appears in the printed specification of the above numbered patent requiring correction as follows: Page 5, second column, line 36, claim 16, for the syllable "able" read ably; page 6, second column, line 7, claim 27, for "responsible" read responsive; and that the said Letters Patent should be read with these corrections therein that the same may conform to the record of the case in the Patent Office.

Signed and sealed this 12th day of March, A. D. 1935.

Leslie Frazer (Seal)                                                        Acting Commissioner of Patents.